US008818326B2

(12) United States Patent
Ishii et al.

(10) Patent No.: US 8,818,326 B2
(45) Date of Patent: Aug. 26, 2014

(54) BASE STATION APPARATUS, MOBILE COMMUNICATION SYSTEM AND COMMUNICATION CONTROL METHOD

(75) Inventors: Hiroyuki Ishii, Kanagawa (JP); Anil Umesh, Kanagawa (JP); Tadashi Uchiyama, Kanagawa (JP); Seigo Harano, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 357 days.

(21) Appl. No.: 13/062,887

(22) PCT Filed: Sep. 7, 2009

(86) PCT No.: PCT/JP2009/065586

§ 371 (c)(1),
(2), (4) Date: May 26, 2011

(87) PCT Pub. No.: WO2010/027072

PCT Pub. Date: Mar. 11, 2010

(65) Prior Publication Data

US 2011/0223883 A1    Sep. 15, 2011

(30) Foreign Application Priority Data

Sep. 8, 2008   (JP) ................................ 2008-230024

(51) Int. Cl.
*H04M 11/00* (2006.01)

(52) U.S. Cl.
USPC ............................ 455/405; 455/406; 370/329

(58) Field of Classification Search
CPC .................................. H04W 4/24; H04W 4/26
USPC .................... 455/405, 406; 370/329
See application file for complete search history.

(56) References Cited

U.S. PATENT DOCUMENTS

| 6,542,728 B1 * | 4/2003 | Kaku ............................. 455/406 |
| 7,933,243 B2 * | 4/2011 | Yi et al. ......................... 370/329 |
| 2006/0198376 A1 | 9/2006 | Takamichi |
| 2007/0121497 A1 * | 5/2007 | Gibson Ang et al. ......... 370/229 |
| 2008/0146191 A1 | 6/2008 | Matsukuma et al. |

FOREIGN PATENT DOCUMENTS

| JP | 2003-348143 A | 12/2003 |
| JP | 2006-245834 A | 9/2006 |
| JP | 2007-89229 A | 4/2007 |
| JP | 2008-154096 A | 7/2008 |

OTHER PUBLICATIONS

International Search Report from PCT/JP2009/065586 dated Dec. 8, 2009 (2 pages).
espacenet Abstract Publication No. JP2007089229A dated Apr. 5, 2007 (1 page).

(Continued)

*Primary Examiner* — Amancio Gonzalez
(74) *Attorney, Agent, or Firm* — Osha Liang LLP

(57) ABSTRACT

To provide a base station apparatus, mobile communication system and communication control method for enabling appropriate time charging based on actual communication conditions to be performed, the base station apparatus is provided with a connection section that establishes connection with a user equipment ($100_n$), timing sections (2084, 2085, 2011 and 20816) that measure time under charging such that the user equipment ($100_n$) is in a state capable of communicating within a connection period during which the user equipment ($100_n$) is in a connection state, and a charging section (2012) that determines a charging amount based on the time measured by the timing sections (2084, 2085, 2011 and 20816).

12 Claims, 10 Drawing Sheets

(56) References Cited

OTHER PUBLICATIONS espacenet Abstract Publication No. JP2003348143A daed Dec. 5, 2003 (1 page).
3GPP TS 36.211 V8.3.0; "3rd Generation Partnership Project; Technical Specification Group Radio Access Network; Evolved Universal Terrestrial Radio Access (E-UTRA); Physical Channels and Modulation (Release 8)"; May 2008 (77 pages).
3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2008 (126 pages).
3GPP TS 36.213 V8.3.0; "3rd Generation Partnership Project; Technical Specification Group Radio Access Network; Evolved Universal Terrestrial Radio Access (E-UTRA); Physical layer procedures (Release 8)"; May 2008 (45 pages).
3GPP TS 36.321 V8.2.0; "3rd Generation Partnership Project; Technical Specification Group Radio Access Network; Evolved Universal Terrestrial Radio Access (E-UTRA) Medium Access Control (MAC) protocol specification (Release 8)"; May 2008 (33 pages).
Office Action mailed Oct. 8, 2013 in related Japanese application No. JP2010-527846 (with translation)(6 pages).

* cited by examiner

BASE STATION APPARATUS, MOBILE COMMUNICATION SYSTEM AND COMMUNICATION CONTROL METHOD

TECHNICAL FIELD

The present invention relates to a base station apparatus, mobile communication system and communication control method for determining a charging amount in a state connected with user equipment.

BACKGROUND ART

The communication system that is a successor to WCDMA and HSDPA i.e. the LTE (Long Term Evolution) has been studied by 3GPP that is the standardization group of WCDMA, and as a radio access scheme, OFDMA (Orthogonal Frequency Division Multiplexing Access) is defined in downlink, while SC-FDMA (Single-Carrier Frequency Division Multiple Access) is defined in uplink (for example, see Non-patent Document 1).

OFDMA is a system for dividing a frequency band into a plurality of narrow frequency bands (subcarriers), and assigning data onto each frequency band to perform transmission. In OFDMA, subcarriers are arranged densely in the frequency domain without interfering with one another even with part thereof overlapping, high-speed transmission is thereby achieved, and spectral efficiency is enhanced.

SC-FDMA is a transmission system for dividing the frequency band so that a plurality of terminals uses different frequency bands to perform transmission, and thereby enabling interference among the terminals to be reduced. SC-FDMA has the feature that the fluctuation in the transmission power is decreased, and therefore, actualizes low power consumption in the terminal and wide coverage.

The LTE system is a system in which a plurality of mobile stations shares one, or two or more physical channels to perform communications both in uplink and downlink. The channel shared by a plurality of mobile stations is generally referred to as the shared channel, and in the LTE system, is the "Physical Uplink Shared Channel (PUSCH)" in uplink, while being the "Physical Downlink Shared Channel (PDSCH)" in downlink.

Further, as a transport channel, the shared channels are the "Uplink Shared Channel (UL-SCH)" in uplink, and the "Downlink Shared Channel (DL-SCH)" in downlink.

Then, in the communication system using the above-mentioned shared channels, it is necessary to select a mobile station to assign a shared channel for each sub-frame (1 ms in the LTE system), and perform signaling to notify the selected mobile station of the assignment of the shared channel.

The control channel used for this signaling is referred to as the "Physical Downlink Control Channel (PDCCH)" or "Downlink L1/L2 Control Channel (DL L1/L2 Control Channel)" in the LTE system.

In addition, the processing for selecting a mobile station to assign a shared channel for each sub-frame is generally referred to as "scheduling". In this case, a mobile station to assign the shared channel is dynamically selected for each sub-frame, and the processing may be referred to as "dynamic scheduling". Further, "assigning a shared channel" may be expressed by "assigning radio resources for the shared channel".

For example, the information of the Physical Downlink Control Channel includes "downlink scheduling information", "uplink scheduling grant", etc. (for example, see Non-patent Document 2).

In addition, in LTE, discontinuous reception (DRX) control is applied. The discontinuous reception control is applied in the case that the base station apparatus and the mobile station are connected with each other and that data to communicate does not exit. The mobile station in the discontinuous reception state receives the Physical Downlink Control Channel (PDCCH) periodically i.e. intermittently. In this case, it is essential only that the mobile station receives the Physical Downlink Control Channel intermittently instead of all the timing, and it is thereby possible to reduce power consumption in the battery (battery saving). The time duration to intermittently receive the Physical Downlink Control Channel in the above-mentioned discontinuous reception control is referred to as ON duration of DRX or On-duration. Further, a cycle to set the On-duration is referred to as the DRX cycle.

Further, in uplink of LTE, timing synchronization is maintained on a signal transmitted from each mobile station in the cell. In other words, in uplink of LTE, the reception timing in the radio base station of the signal transmitted from the each user equipment in the cell is controlled to coincide with one another in a predetermined range. The above-mentioned control is referred to as Transmission Timing Adjustments (Non-patent Document 3).

More specifically, the radio base station measures the reception timing of a signal transmitted from the mobile station, and when the reception timing deviates from the reference timing defined inside the radio base station, transmits a control signal, Timing Advance, to correct the deviation to the mobile station in downlink. Then, based on the Timing Advance, the mobile station adjusts the transmission timing of an uplink signal.

In addition, the mobile station starts or restarts a Time Alignment Timer from the timing at which Timing Advance is received, and at the time the Time Alignment Timer expires, determines that uplink timing synchronization is not maintained. In the case that uplink timing synchronization is not maintained and that it is necessary to perform uplink transmission, the mobile station performs a random access procedure, and establishes uplink timing synchronization (Non-patent Document 4).

In addition, in the discontinuous reception state, generally, data exchange is not performed between the radio base station and the mobile station, and therefore, Timing Advance is not transmitted. In other words, in the discontinuous reception state, there are many cases that uplink timing synchronization is not maintained.

Then, in general, an operator in the mobile communication system offers mobile communication services to users, and collects charges as compensation. Hereinafter, the action of "collecting charges as compensation for offered mobile communication services" is referred to as charging. As a manner for charging, for example, there is charging in accordance with a data amount during communications, charging in accordance with communication time, etc. Alternately, as a flat-rate system, there is the case that the fixed fee is charged for a predetermined period of time e.g. one month irrespective of the data amount and communication time.

CITATION LIST

Non-Patent Literature

[Non-Patent Literature 1]
3GPP TS 36.211 (V8.3.0), "Physical Channels and Modulation", May 2008
[Non-Patent Literature 2]
3GPP TS 36.300 (V8.4.0), "E-UTRA and E-UTRAN Overall description", March 2008

[Non-Patent Literature 3]
3GPP TS36.213 (V.8.3.0), "E-UTRA Physical layer procedures," 4.2.4 Transmission timing adjustments, May 2008
[Non-Patent Literature 4]
3GPP TS 36.321 (V8.2.0), "E-UTRAMAC protocol specification," 5.2 Maintenance of Uplink Time Alignment, May 2008

SUMMARY OF THE INVENTION

Technical Problem

However, the above-mentioned background art has the problem as described below. Generally, when charging is performed in accordance with the communication time, charging is performed based on the time during which the connection state is established between the mobile station and the base station apparatus. Meanwhile, in the LTE system, as described above, as control in the MAC layer, discontinuous reception control, uplink timing synchronization control and the like is performed, and therefore, even in the connection state, there exist the state in which data exchange is not actually performed, and the state in which uplink transmission is not performed. This means that suitable charging based on the actual communication circumstances is not performed by conventional charging based on the time during which the connection state is established.

In view of the above-mentioned problem, it is an object of the invention to provide a base station apparatus, mobile communication system and communication control method for enabling appropriate time charging based on actual communication conditions to be performed.

Solution to Problem

A base station apparatus of the invention is characterized by having a connection section that establishes connection with user equipment, and a timing section that measures a time under charging such that the user equipment is in a state capable of communicating within a connection period during which the user equipment is in a connection state.

According to this configuration, since the base station apparatus measures time under charging such that the user equipment is in a state capable of communicating within a connection period during which the user equipment is in a connection state, it is possible to eliminate the time during which the user equipment is not in the state capable of communicating from the time under charging, even when the base station and the user equipment is in the connection state, and it is possible to perform appropriate charging in consideration of the time during which the mobile communication service is restricted.

Technical Advantage of the Invention

According to the invention, it is possible to achieve the base station apparatus, mobile communication system and communication control method for enabling appropriate time charging based on actual communication conditions to be performed.

DESCRIPTION OF EMBODIMENTS

Figure 1:
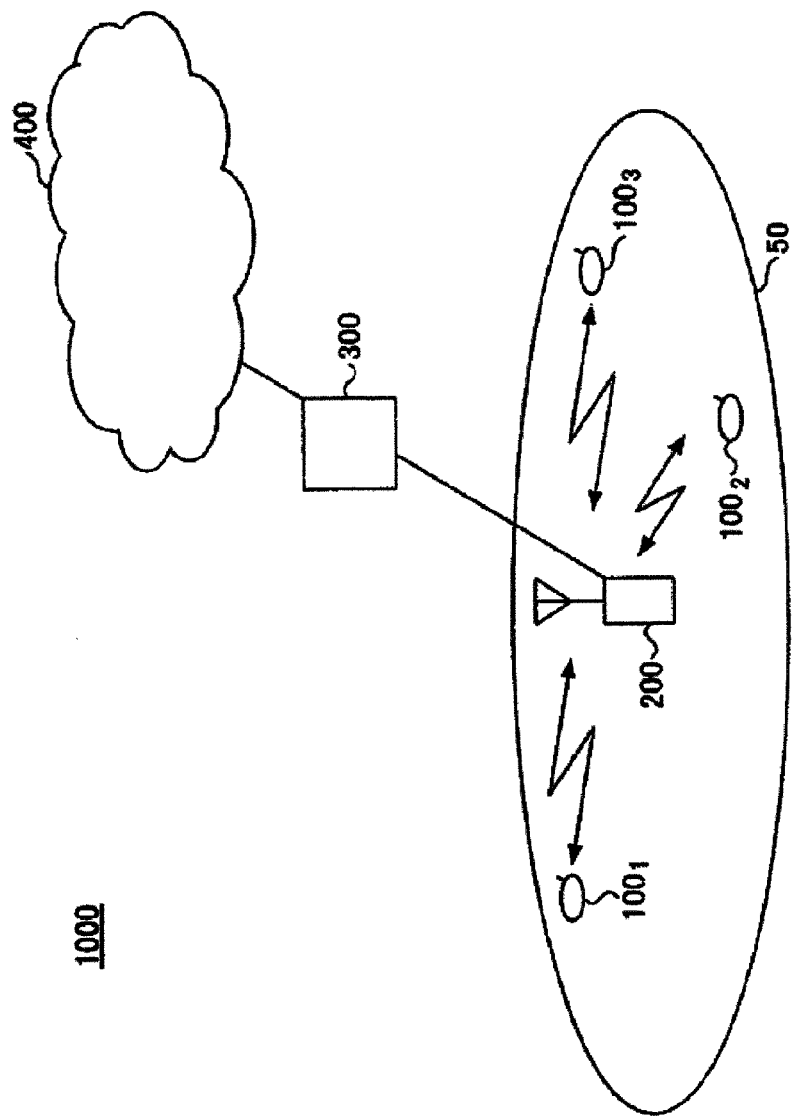
FIG. 1 is a diagram illustrating an Embodiment of a base station apparatus according to the invention and is a system configuration diagram of a radio communication system.

A best mode for carrying out the invention will be described below based on the following Embodiment with reference to drawings. In addition, in all the drawings to explain the Embodiment, components having the same functions are assigned the same reference numeral, and redundant descriptions are omitted.

A radio communication system to which are applied a user equipment and base station apparatus according to the Embodiment will be described with reference to FIG. 1.

A radio communication system 1000 is a system to which Evolved UTRA and UTRAN (alias: Long Term Evolution, or Super 3G) is applied, for example, and is provided with a radio base station (eNB: e Node B) 200 and a plurality of user equipments (UE: User Equipment) $100_n$ ($100_1$, $100_2$, $100_3$, ..., $100_n$, n is an integer where n☐0). The radio base station 200 is connected to an upper station, for example, access gateway apparatus 300, and the access gateway apparatus 300 is connected to a core network 400. Herein, the user equipment $100_n$ communicates with the radio base station 200 in a cell 50 by Evolved UTRA and UTRAN. In addition, the access gateway apparatus 300 may be also referred to as MME/SGW (Mobility Management Entity/Serving Gateway).

In the following description, the user equipment $100_n$ ($100_1$, $100_2$, $100_3$, $100_n$, ..., $100_n$) has the same configuration, function and state, and is described as the user equipment $100_n$ below to give an explanation unless otherwise specified. For convenience in description, the mobile station performs radio communications with the radio base station, and more generally, is user equipment including a mobile terminal and a fixed terminal.

In the radio communication system 1000, as a radio access scheme, OFDMA (Orthogonal Frequency Division Multiplexing Access) is applied in downlink, while SC-FDMA (Single-Carrier Frequency Division Multiple Access) is applied in uplink. As described above, OFDMA is a system for dividing a frequency band into a plurality of narrow frequency bands (subcarriers), and assigning data onto each frequency band to perform transmission. SC-FDMA is a transmission system for dividing the frequency band so that a plurality of terminals uses different frequency bands to perform transmission, and thereby enabling interference among the terminals to be reduced.

Described herein are communication channels in Evolved UTRA and UTRAN. In downlink, used are the Physical Downlink Shared Channel (PDSCH) shared among the user equipments $100_n$, and the Physical Downlink Control Channel (PDCCH) that is a control channel in downlink. In other words, the downlink channel indicates the Physical Downlink Shared Channel and the Physical Downlink Control Channel.

In downlink, on the Physical Downlink Control Channel is notified user information and information of transport format mapped to the Physical Downlink Shared Channel, user information and information of transport format mapped to the Physical Uplink Shared Channel, etc. and user data is transmitted on the Physical Downlink Shared Channel. Further, in downlink, in addition to the above-mentioned Physical Downlink Control Channel and the Physical Downlink Shared Channel, the Physical HARQ Indicator Channel (PHICH: Physical Hybrid-ARQ Indicator Channel) is transmitted to notify of acknowledgement information for the Physical Uplink Shared Channel.

In addition, the transport channel mapped to the Physical Downlink Shared Channel is the Downlink Shared Channel (DL-SCH). In other words, the user data is mapped to the Downlink Shared Channel. Further, to the Downlink Shared Channel are mapped the DTCH (Dedicated Traffic Channel) that is a signal of U-plane and DCCH (Dedicated Control Channel) that is a signal of C-plane as a logical channel, BCCH (Broadcasting Control Channel) that is of broadcast information, etc.

Further, the user information and the information of transport format mapped to the Physical Downlink Shared Channel as described above is referred to as the downlink scheduling information. The downlink scheduling information may be also referred to as the downlink assignment information or downlink scheduling grant.

Meanwhile, the user information and the information of transport format mapped to the Physical Uplink Shared Channel is referred to as the uplink scheduling grant. The downlink scheduling information and uplink scheduling grant may be collectively referred to as the downlink control information.

Moreover, in downlink, a downlink reference signal (DL RS) is transmitted as a pilot signal. For example, the downlink reference signal is used in channel estimation and measurement of the radio quality in downlink in the user equipment $100_n$.

In uplink, used are the Physical Uplink Shared Channel (PUSCH) shared among the user equipments $100_n$, and the Physical Uplink Control Channel (PUCCH). In addition, in uplink of LTE, the CQI (Channel Quality Indicator), scheduling request and acknowledgement information for the downlink shared channel are multiplexed onto the Physical Uplink Shared Channel and transmitted when the Physical Uplink Shared Channel is transmitted in the sub-frame, while being transmitted using the Physical Uplink Control Channel when the Physical Uplink Shared Channel is not transmitted in the sub-frame.

In addition, in uplink of LTE, the Physical Random Access Channel (PRACH) for random access is used, in addition to the Physical Uplink Shared Channel and Physical Uplink Control Channel.

Further, as a reference signal in uplink, used are a reference signal (DM RS: Demodulation Reference Signal) for demodulation of the Physical Uplink Shared Channel and the Uplink Control Channel, and a reference signal (Sounding RS) for sounding.

Figure 2:
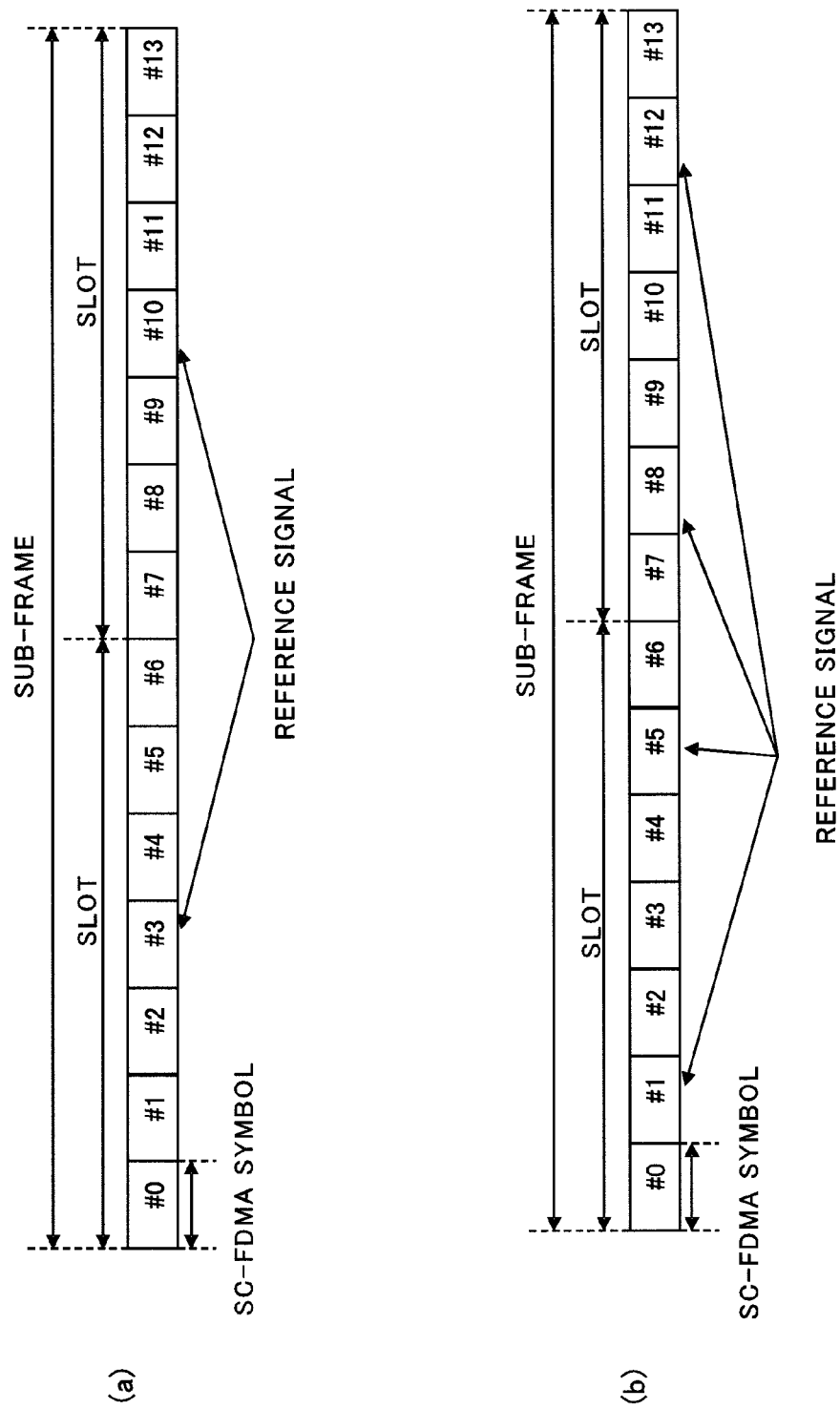
FIG. 2 contains diagrams illustrating the Embodiment of the base station apparatus according to the invention, where FIG. 2 (a) is an explanatory view of a configuration of the Physical Uplink Shared Channel and FIG. 2 (b) is an explanatory view of a configuration of the Physical Uplink Control Channel.

FIG. 2 shows configurations of the Physical Uplink Shared Channel and the Physical Uplink Control Channel. As shown in FIG. 2(*a*), on the Physical Uplink Shared Channel, demodulation reference signals are mapped to part of SC-FDMA symbols in a single sub-frame, and data signals or control signals are mapped to the remaining SC-FDMA symbols.

In other words, the Physical Uplink Shared Channel is comprised of 14 SC-FDMA symbols in a single sub-frame, and demodulation reference signals are mapped to #3 and #10 SC-FDMA symbols. Further, data signals are mapped to the remaining SC-FDMA symbols.

Meanwhile, as shown in FIG. 2(*b*), the Physical Uplink Control Channel (format 2) is comprised of 14 SC-FDMA symbols in a single sub-frame, and demodulation reference signals are mapped to #1, #5, #8 and #12 SC-FDMA symbols. Further, control signals are mapped to the remaining SC-FDMA symbols. Herein, for example, the control signal is the CQI that is downlink radio quality information. In addition, the Physical Uplink Control Channel may have a configuration other than the configuration as shown in FIG. 2(*b*). For example, the Physical Uplink Control Channel may have a configuration in which the number of SC-FDMA symbols to which demodulation reference signals are mapped is six in a single sub-frame. In addition, as well as the CQI, a Rank Indicator (RI) and Precoding Matrix Indicator (PMI) may be mapped to the Physical Uplink Control Channel (format 2). In addition, the CQI, RI and PMI may be collectively referred to as CSI (Channel State Information).

Figure 3:
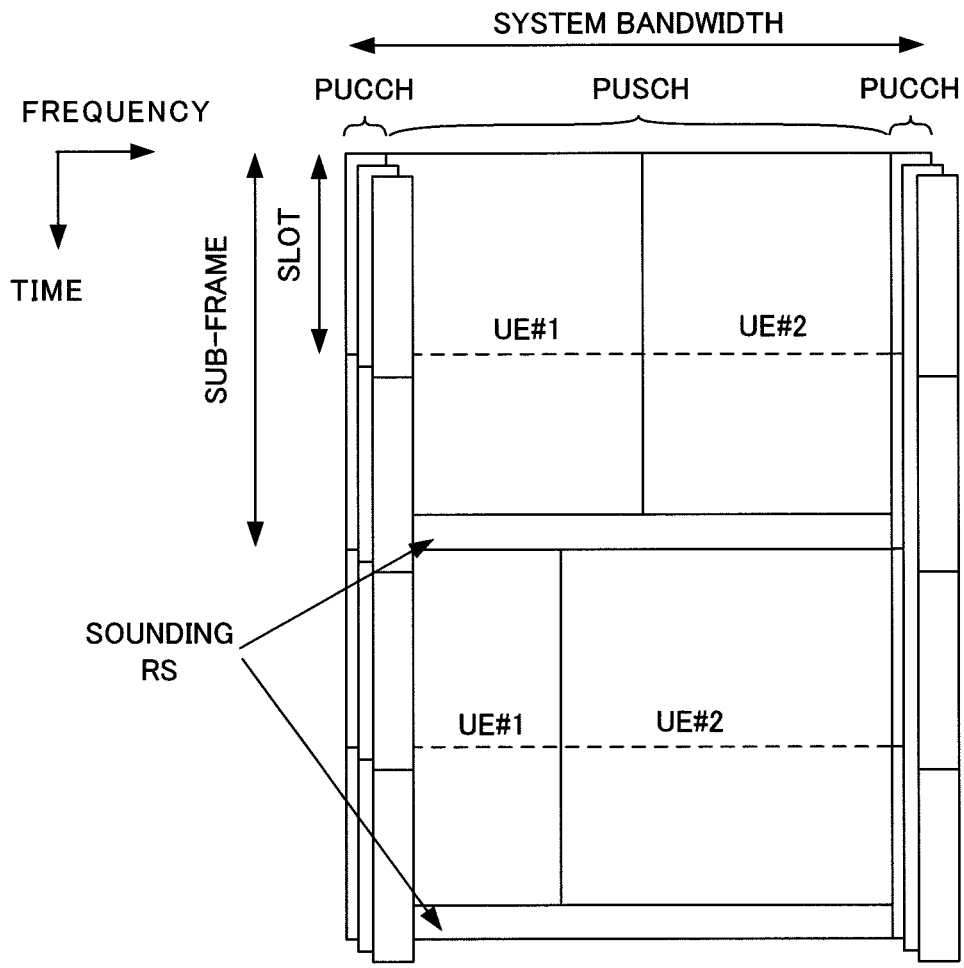
FIG. 3 is a diagram illustrating the Embodiment of the base station apparatus according to the invention and is an explanatory view of time resources and frequency resources to which sounding reference signals are mapped.

FIG. 3 shows time resources and frequency resources to which sounding reference signals are mapped. The sounding reference signal is mapped to the last SC-FDMA symbol in a single sub-frame. In other words, in a sub-frame in which a sounding reference signal is transmitted, the sounding reference signal is mapped to SC-FDMA symbol #13 in the sub-frame configuration of the Physical Uplink Shared Channel as shown in FIG. 2(*a*).

As described above, in uplink of LTE, on the physical Uplink Shared Channel or the Physical Uplink Control Channel is transmitted the CQI in downlink used in scheduling of the shared channel and adaptive modulation and coding scheme (AMCS) in downlink, and the acknowledgement information (HARQ ACK information) for the Physical Downlink Shared Channel in downlink. Further, the user data is transmitted on the Physical Uplink Shared Channel.

In addition, the transport channel mapped to the Physical Uplink Shared Channel is the Uplink Shared Channel (UL-SCH). In other words, the user data is mapped to the Uplink Shared Channel.

In addition, for example, the aforementioned user data is IP packets by Web browsing, FTP, VoIP, etc., control signals for the processing of Radio Resource Control (RRC) and the like. The user data may be also referred to as packet data. Further, for the user data or the packet data, the designation as a transport channel may be the DL-SCH or UL-SCH, for example, and the designation as a logical channel may be the Dedicated Traffic Channel (DTCH) or Dedicated Control Channel (DCCH), for example.

Figure 4:
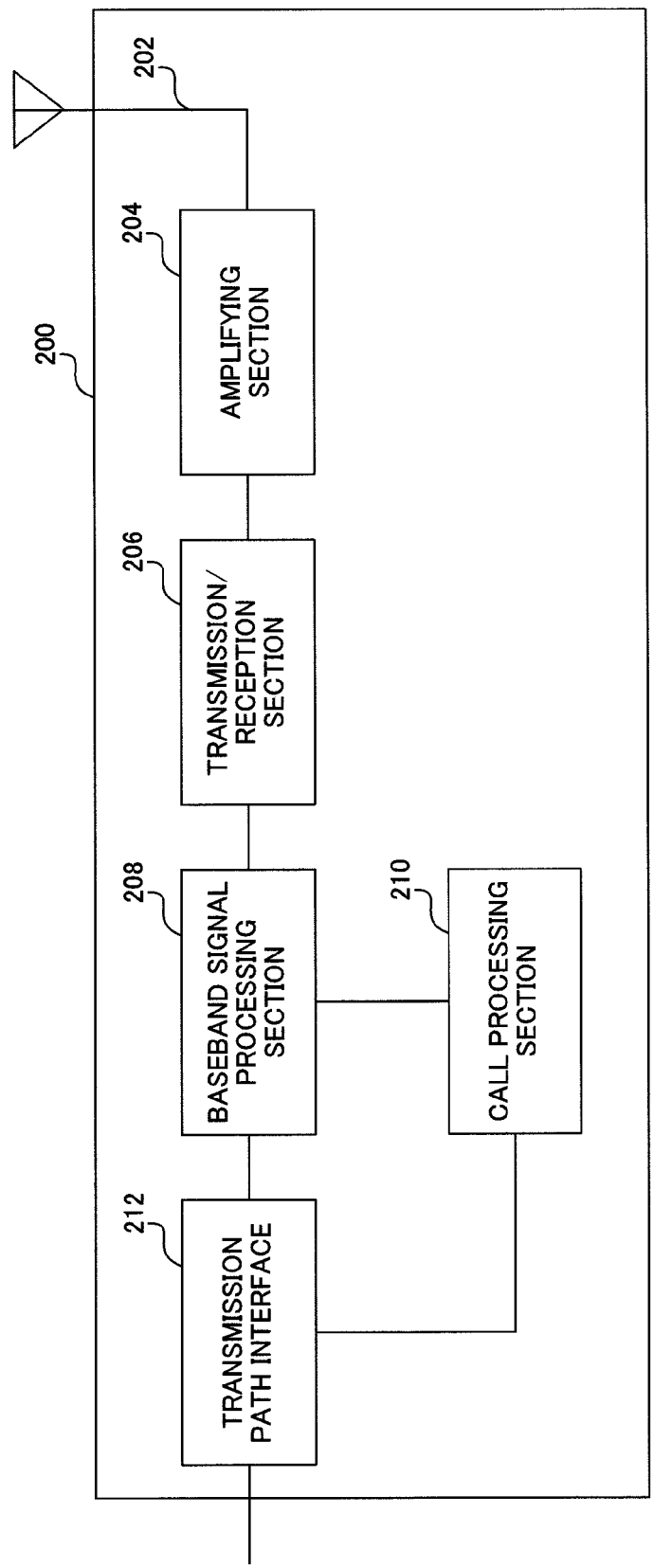
FIG. 4 is a diagram illustrating the Embodiment of the base station apparatus according to the invention and is a block diagram illustrating a configuration of the base station apparatus.

The radio base station 200 according to this Embodiment will be described with reference to FIG. 4. The base station apparatus 200 is provided with a transmission/reception antenna 202, amplifying section 204, transmission/reception section 206, baseband signal processing section 208, call processing section 210 and transmission path interface 212.

The packet data transmitted from the base station apparatus 200 to the user equipment $100_n$ in downlink is input to the baseband signal processing section 208 via the transmission path interface 212 from an upper station positioned upper than the base station apparatus 200, for example, access gateway apparatus 300.

The baseband signal processing section 208 performs PDCP layer transmission processing, segmentation and concatenation of packet data, RLC (Radio Link Control) layer transmission processing such as transmission processing of RLC retransmission control, MAC (Medium Access Control) retransmission control e.g. transmission processing of HARQ (Hybrid Automatic Repeat request), scheduling, transmission format selection, channel coding, and Inverse Fast Fourier Transform (IFFT) processing on the data to transfer to the transmission/reception section 206. Further, in addition to the packet data, the broadcast information transmitted from the base station apparatus 200 to the user equipment $100_n$ on the Broadcast Channel undergoes the same transmission processing, and is transferred to the transmission/reception section 206.

The transmission/reception section 206 performs frequency conversion processing for converting the baseband signal output from the baseband signal processing section 208 into a signal of a radio frequency band, and then, the signal is amplified in the amplifying section 204, and is transmitted from the transmission/reception antenna 202.

Meanwhile, with respect to the packet data transmitted from the user equipment $100_n$ to the base station apparatus 200 in uplink, a radio frequency signal received in the transmission/reception antenna 202 is amplified in the amplifying section 204, undergoes frequency conversion in the transmission/reception section 206, is thereby converted into a baseband signal, and is input to the baseband signal processing section 208.

The baseband signal processing section 208 performs FFT processing, IDFT processing, error correcting decoding, reception processing of MAC retransmission control, reception processing of RLC layer, and reception processing of PDCP layer on the input baseband signal, and the signal is transferred to the access gateway apparatus 300 via the transmission path interface 212.

Herein, as described above, the packet data is voice signals in VoIP, and signals transmitted in each application such as FTP, streaming and Web browsing.

The call processing section 210 manages the communication state between the user equipment $100_n$ and the base station apparatus 200, further manages the state of the base station apparatus 200, and performs resource assignment. Further, as described later, the call processing section 210 performs charging based on the time in the non-discontinuous reception state, the time during which uplink timing synchronization is established, the time during which uplink resources are assigned, the time during which uplink radio quality is good, etc. during the connection time.

Figure 5:
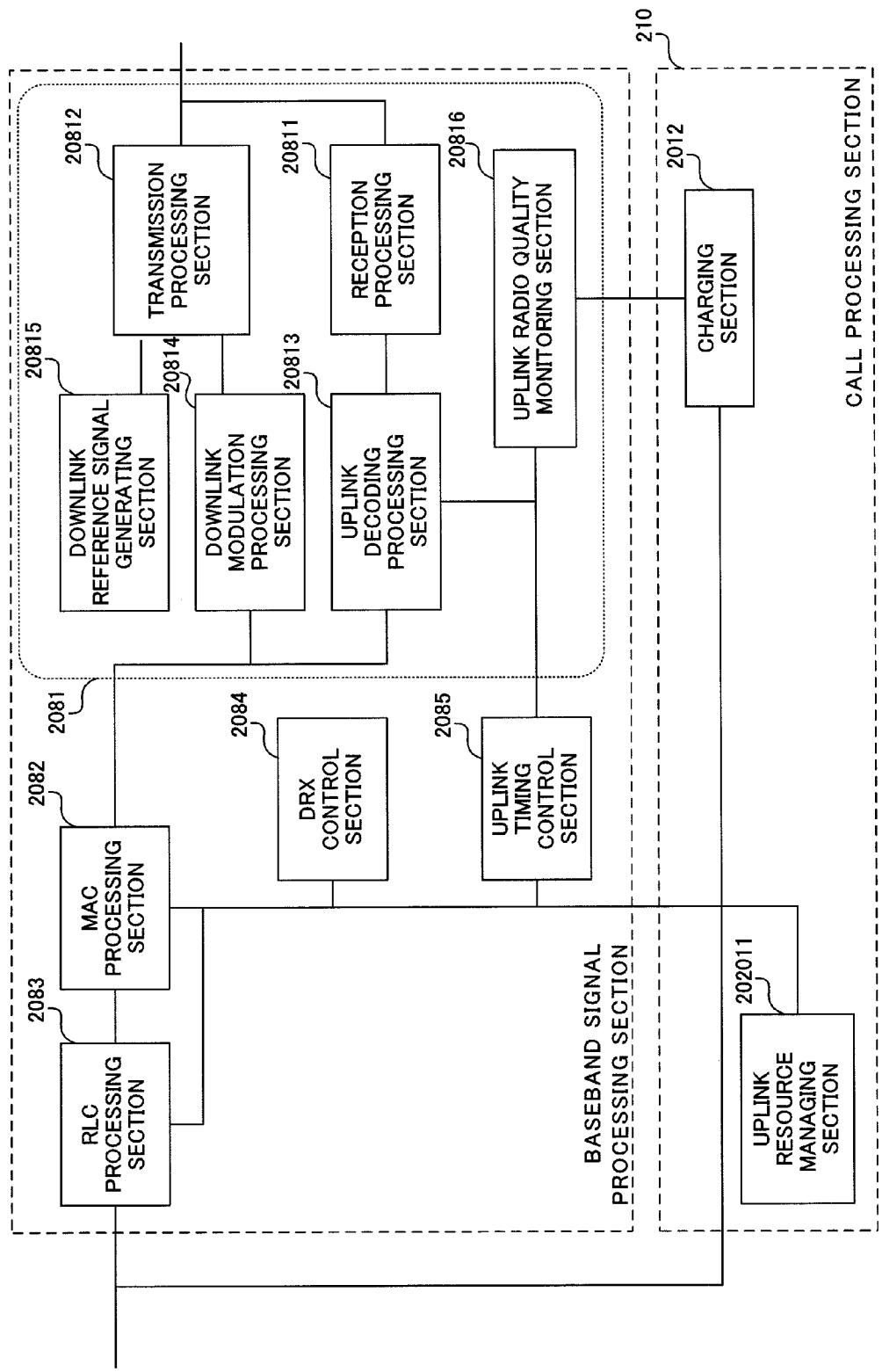
FIG. 5 is a diagram illustrating the Embodiment of the base station apparatus according to the invention and is a block diagram illustrating configurations of a baseband processing section and a call processing section.

Configurations of the baseband signal processing section 208 and call processing section 210 will be described below with reference to FIG. 5. The baseband signal processing section 208 is provided with a layer 1 processing section 2081, MAC processing section 2082, and RLC processing section 2083. Further, the layer 1 processing section 2081 is provided with a reception processing section 20811, transmission processing section 20812, uplink decoding processing section 20813, downlink modulation processing section 20814, downlink reference signal generating section 20815, and uplink radio quality monitoring section 20816.

The layer 1 processing section 2081 performs channel coding and IFFT processing on data to transmit in downlink, and channel decoding, IDFT processing, FFT processing and the like on data transmitted in uplink. More specifically, with respect to signals to transmit in downlink such as, for example, the downlink shared channel and downlink scheduling information, uplink scheduling grant, acknowledgement information for the uplink shared channel, Broadcast Channel (BCH) and Paging Channel (PCH), the downlink modulation processing section 20814 performs coding processing of turbo coding, convolutional coding and the like, and interleaving processing on the signal to input to the transmission processing section 20812.

Further, the downlink reference signal generating section 20815 generates a downlink reference signal to input to the transmission processing section 20812. The transmission processing section 20812 multiplexes the signals of the downlink shared channel and downlink scheduling information, uplink scheduling grant, acknowledgement information for the uplink shared channel, Broadcast Channel (BCH), Paging Channel (PCH), etc., and the downlink reference signal, and then, performs IFFT processing, CP addition processing and the like to input to the transmission/reception section 206.

Meanwhile, with respect to signals received in uplink such as, for example, the CQI, ACK information, uplink shared channel, demodulation reference signal and sounding reference signal, the transmission/reception section 206 inputs the baseband signal to the reception processing section 20811, the section 20811 performs CP removal processing, FFT processing, frequency equalization processing, Inverse Discrete Fourier Transform (IDFT) processing, etc. on the signal, and then, the uplink decoding processing section 20813 performs decoding processing such as convolutional decoding and turbo decoding on the signal.

Then, decoded signals of the CQI, ACK information and uplink shared channel, etc. are transferred to the MAC processing section 2082. Meanwhile, with respect to the sounding reference signal, the uplink decoding processing section 20813 calculates the SIR of the signal to notify the MAC processing section 2082.

Further, the uplink decoding processing section 20813 calculates the SIR of the sounding reference signal, the SIR of the demodulation reference signal on the Physical Uplink Shared Channel, and the SIR of the demodulation reference signal on the Physical Uplink Control Channel to notify the uplink radio quality monitoring section 20816.

The uplink radio quality monitoring section 20816 monitors whether or not a criterion of radio quality is met on each of the SIR of the sounding reference signal, the SIR of the demodulation reference signal on the Physical Uplink Shared Channel, and the SIR of the demodulation reference signal on the Physical Uplink Control Channel notified from the uplink decoding processing section 20813. The uplink radio quality monitoring section 20816 stores thresholds as criteria for uplink radio quality, measures a time during which the radio quality is the threshold or more, and notifies the time during which the radio quality is good to a charging section 2012 of the call processing section 210, described later. In addition, as monitoring of the radio quality, instead of monitoring all three SIRs as described above, at least one SIR may be monitored among three SIRs. In addition, for example, "the time during which the radio quality is good" may mean the time during which the radio quality enables normal communications. Conversely, "the radio quality that is not good" may mean poor radio quality such that normal communications cannot be implemented.

In addition, the Physical Uplink Control Channel may be the Physical Uplink Control Channel of Format 2, 2A or 2B used in transmission of the CQI, the Physical Uplink Control Channel of Format 1A or 1B used in transmission of ACK, or the Physical Uplink Control Channel of Format 1 used in transmission of a scheduling request.

Further, the uplink decoding processing section 20813 calculates a delay profile of propagation in uplink, based on the sounding reference signal, the demodulation reference signal on the Physical Uplink Shared Channel, the demodulation reference signal on the Physical Uplink Control Channel, etc. to notify the uplink timing control section 2085.

In addition, the layer 1 processing section 2081 performs demodulation processing on the scheduling request, and notifies the MAC processing section 2082 of the demodulation result.

The MAC processing section 2082 receives, from the layer 1 processing section 2081, the CQI and ACK information reported from the user equipment $100_n$, the demodulation result of the uplink shared channel, and the scheduling request and the SIR of the sounding reference signal transmitted in uplink from the user equipment $100_n$.

The MAC processing section 2082 performs MAC retransmission control of downlink packet data e.g. HARQ transmission processing, scheduling processing, transmission format selection processing, frequency resource assignment processing, etc. Herein, the scheduling processing indicates processing for selecting the user equipment $100_n$ that receives packet data using the shared channel in a downlink sub-frame.

Further, the transmission format selection processing indicates processing for determining a modulation scheme, coding rate and data size concerning the packet data received by the user equipment $100_n$ selected in scheduling. The determination of the modulation scheme, coding rate and data size is made, for example, based on the value of the CQI reported in uplink from the user equipment $100_n$.

Furthermore, the frequency resource assignment processing indicates processing for determining resource blocks used in the packet data received by the user equipment $100_n$ selected in scheduling. The determination of resource blocks is made, for example, based on the CQI reported in uplink from the user equipment $100_n$. The CQI reported from the user equipment $100_n$ is notified from the layer 1 processing section 2081.

Then, the MAC layer processing section 2082 notifies the layer 1 processing section 2081 of the ID of the user (user equipment $100_n$) that performs communications using the Physical Downlink Shared Channel determined by the above-mentioned scheduling processing, transmission format selection processing and frequency resource assignment processing, and of the information of transport format of the packet data i.e. of the downlink scheduling information. Further, the MAC processing section 2082 outputs the packet data to transmit to the user equipment $100_n$ to the layer 1 processing section 2081.

Moreover, the MAC processing section 2082 performs reception processing of MAC retransmission control of uplink packet data, scheduling processing, transmission format selection processing, frequency resource assignment processing and the like. Herein, the scheduling processing indicates processing for selecting the user equipment $100_n$ to transmit the packet data using the shared channel in a predetermined sub-frame.

Further, the transmission format selection processing indicates processing for determining a modulation scheme, coding rate and data size on the packet data for the user equipment $100_n$ selected in scheduling to transmit. The determination of the modulation scheme, coding rate and data size is made, for example, based on the SIR of the sounding reference signal transmitted in uplink from the user equipment $100_n$, and path loss between the user equipment $100_n$ and the base station apparatus.

Furthermore, the frequency resource assignment processing indicates processing for determining resource blocks used in transmission of the packet data for the user equipment $100_n$ selected in scheduling to transmit. The determination of resource blocks is made, for example, based on the SIR of the sounding reference signal transmitted in uplink from the user equipment $100_n$.

Then, the MAC processing section 2082 generates the ID of the user (user equipment $100_n$) that performs communications using the Physical Uplink Shared Channel determined by the above-mentioned scheduling processing, transmission format selection processing and frequency resource assignment processing, and the information of transport format of the user data i.e. the uplink scheduling grant to notify the layer 1 processing section 2081. Further, the MAC processing section 2082 generates acknowledgement information based on the demodulation result of the uplink shared channel, and notifies the layer 1 processing section 2081 of the acknowledgement information for the uplink shard channel.

Meanwhile, when the Physical Downlink Control Channel for new transmission i.e. the downlink scheduling information or the uplink scheduling grant is transmitted to the user equipment $100_n$, the MAC processing section 2082 notifies the DRX control section 2084 of the information indicative of the transmission together with the time stamp (time information).

Further, when the scheduling request transmitted from the user equipment $100_n$ is received, the MAC processing section 2082 notifies the DRX control section 2084 of the information indicative of the reception together with the time stamp (time information).

The RLC processing section 2083 performs segmentation and concatenation of downlink packet data, RLC layer transmission processing such as transmission processing of RLC retransmission control, segmentation and concatenation of uplink packet data, and RLC layer reception processing such as reception processing of RLC retransmission control. In addition, the RLC processing section 2083 may perform the PDCP layer processing in addition to the aforementioned RLC layer processing.

The DRX control section 2084 manages the discontinuous reception state (DRX state) of the user equipment $100_n$. More specifically, when the user equipment $100_n$ is in the non-discontinuous reception state (Non-DRX state, i.e. the state in which the user equipment $100_n$ is not in the DRX state), the DRX control section 2084 receives the timing at which the Physical Downlink Control Channel for new transmission i.e. the downlink scheduling information or uplink scheduling grant is transmitted to the user equipment $100_n$, and from the timing, starts or restarts a DRX Inactive Timer. Herein, restarting means that a value of the Timer that is already started is reset to an initial value to start the Timer again.

Then, at the time the DRX Inactive Timer expires, the DRX control section 2084 determines that the user equipment $100_n$ changes from the Non-DRX state to the DRX state. In addition, when the user equipment $100_n$ is in the DRX state, the DRX control section 2084 determines that the user equipment $100_n$ changes from the DRX state to the Non-DRX state, from the timing at which the Physical Downlink Control Channel indicating new transmission is transmitted. Alternately, when the user equipment $100_n$ is in the DRX state, the DRX control section 2084 determines that the user equipment $100_n$ changes from the DRX state to the Non-DRX state, from the timing at which the scheduling request is received in uplink from the user equipment $100_n$. In addition, as the DRX state, two types, Short DRX state and Long DRX state, may be defined. The DRX control section 2084 measures time during which the user equipment $100_n$ is in the Non-DRX state during the connected time, and notifies the charging section 2012 of the measured time.

Alternately, instead of the time in the Non-DRX state, the DRX control section 2084 may measure time during which the user equipment $100_n$ is in the Non-DRX state or Short DRX state, and notify the charging section 2012 of the measured time. The reason is that the Short DRX state is a state closer to the Non-DRX state and can be regarded as a subject of charging. Otherwise, the DRX control section 2084 may make the above-mentioned determination whether the user equipment $100_n$ is in the Non-DRX state or the DRX state based on whether or not the user equipment $100_n$ is in the Active Time. In other words, the state in which the user equipment $100_n$ is in the Active Time may be regarded as the Non-DRX state, while the state in which the user equipment $100_n$ is not in the Active Time may be regarded as the DRX state.

The definition of the Active Time will be described below. For example, the Active Time may include the On-duration in discontinuous reception control, the time during which the DRX Inactivity Timer is activated, and the time during which the DRX Retransmission Timer or Contention Resolution Timer is activated. Further, the Active Time may include the time during which scheduling is pending. Alternatively, when the uplink scheduling grant for retransmission arises or after succeeding reception of a random access response, the Active Time may include the time during which the user equipment $100_n$ does not receive even once the PDCCH having RNTI or temporary RNTI to the user equipment $100_n$ for indicating new transmission. Herein, The DRX Retransmission Timer is a timer that is started after the expiration of the HARQ RTT Timer that is started after receiving newly transmitted packet data, and is the timer for defining the time interval at which the packet data is retransmitted. Meanwhile, the Contention Resolution Timer is a timer that is started from the timing of transmitting Message 3 in the random access procedure, and the timer for defining the time interval at which Contention Resolution by Message 4 is performed. Further, "the scheduling request is pending" indicates the state between transmission of the scheduling request in uplink and actual notification of the uplink grant (uplink scheduling grant) in downlink. For details of the Active Time, see Chapter 5.7 of Non-patent Document 4.

Based on the uplink delay profile of the user equipment $100_n$ notified from the uplink decoding processing section 20813, when necessary, the uplink timing control section 2085 notifies the user equipment $100_n$ of a UL transmission timing control signal, Timing Advance, to adjust the transmission timing of the user equipment $100_n$ via the MAC processing section 2082 and layer 1 processing section 2081.

In other words, the uplink timing control section 2085 determines the transmission timing so as to adjust reception timings of multi-path reception signals from a plurality of concurrent access user equipments $100_n$ to within the Cyclic Prefix (CP) duration at the reception end of the base station apparatus 200, and notifies the user equipment $100_n$ of an adjustment amount of transmission timing for the user equipment $100_n$ to adjust so as to achieve the transmission timing as the UL transmission timing control signal, Timing Advance via the MAC processing section 2082 and layer 1 processing section 2081. Herein, more specifically, the Timing Advance may be multiplexed into normal packet data, as control information of the MAC layer i.e. a MAC Control Element, and notified to the user equipment $100_n$. In other words, the MAC Control Element to notify of the Timing Advance is notified to the user equipment $100_n$ as part of MAC PDU that is a data unit of the MAC layer.

Herein, for example, the adjustment amount of transmission timing for the user equipment $100_n$ to adjust is calculated from "optimal FFT timing of each user equipment $100_n$-reference FFT timing". In other words, the adjustment amount is calculated so that "optimal FFT timing of each user equipment-reference FFT timing=0".

The uplink timing control section 2085 starts or restarts the Time Alignment Timer from the timing of transmitting the Timing Advance to the user equipment $100_n$ in a state in which uplink timing synchronization is established between the user equipment $100_n$ and the base station apparatus 200. Herein, restarting means that a value of the Timer that is already started is reset to an initial value to start the Timer again.

Then, at the time the Time Alignment Timer expires, the uplink timing control section 2085 determines that the state between the user equipment $100_n$ and the base station apparatus 200 is changed from the state in which uplink timing synchronization is established therebetween to the state in which uplink timing synchronization is not established therebetween.

Further, in the random access procedure, when the Timing Advance and uplink scheduling grant are transmitted to the user equipment $100_n$ by an RA response (random access response signal), the uplink shared channel responding to the uplink scheduling grant is received, and the decoded result is correct (i.e. the CRC check result is ok), from the timing the uplink timing control section 2085 determines that the state between the user equipment $100_n$ and the base station apparatus 200 is changed from the state in which uplink timing synchronization is not established therebetween to the state in which uplink timing synchronization is established therebetween.

The uplink timing control section 2085 measures a time during which the user equipment $100_n$ is in the state in which uplink timing synchronization is established between the user equipment $100_n$ and the base station apparatus 200 during the connection time, and notifies the charging section 2012 of the measured time.

Further, the uplink timing control section 2085 determines that the state between the user equipment $100_n$ and the base station apparatus 200 is changed from the state in which uplink timing synchronization is established therebetween to the state in which uplink timing synchronization is not established therebetween by the expiration of the Time Alignment Timer as described above, and notifies the uplink resource managing section 2011 of the information that the state between the user equipment $100_n$ and the base station apparatus 200 is changed from the state in which uplink timing synchronization is established therebetween to the state in which uplink timing synchronization is not established therebetween.

Furthermore, when the uplink shared channel responding to the uplink scheduling grant in the above-mentioned RA response (random access response signal) is received, and the decoded result is correct (i.e. the CRC check result is ok), from the timing the uplink timing control section 2085 determines that the state between the user equipment 100$_n$ and the base station apparatus 200 is changed from the state in which uplink timing synchronization is not established therebetween to the state in which uplink timing synchronization is established therebetween, and notifies the uplink resource managing section 2011 of the information that the state between the user equipment 100$_n$ and the base station apparatus 200 is changed from the state in which uplink timing synchronization is not established therebetween to the state in which uplink timing synchronization is established therebetween. In addition, the uplink shared channel responding to the uplink scheduling grant in the RA response (random access response signal) is the uplink shared channel which the user equipment 100$_n$ is instructed to transmit in uplink by the uplink scheduling grant in the RA response (random access response signal).

The uplink resource managing section 2011 manages uplink resources to assign to the user equipment 100$_n$. Herein, for example, the uplink resources are radio resources for the sounding reference signal to assign to the user equipment 100$_n$ and radio resources for the Physical Uplink Control Channel to assign to the user equipment 100$_n$. Further, using radio resources for the Physical Uplink Control Channel, for example, the user equipment 100$_n$ transmits the CQI, RI, PMI, acknowledgement information for the downlink shared channel, scheduling request, etc.

For example, when uplink timing synchronization is established by the random access procedure, the uplink resource managing section 2011 assigns uplink resources to the user equipment 100$_n$. Meanwhile, for example, when the user equipment 100$_n$ changes to the state in which uplink timing synchronization is not established by the expiration of the Time Alignment Timer, the uplink resource managing section 2011 releases the uplink resources assigned to the user equipment 100$_n$.

The uplink resource managing section 2011 measures a time during which uplink resources are assigned to the user equipment 100$_n$ during the connection time, and notifies the charging section 2012 of the measured time.

The charging section 2012 determines a charging amount in consideration of the measured time notified from the DRX control section 2084, uplink timing control section 2085, uplink resource managing section 2011 and uplink radio quality monitoring section 20816 during the connection time between the base station apparatus 200 and the user equipment 100$_n$.

More specifically, the charging section 2012 is notified of the time during which the user equipment 100$_n$ is in the Non-DRX state from the DRX control section 2084, the time during which uplink timing synchronization is established between the user equipment 100$_n$ and the base station apparatus 200 from the uplink timing control section 2085, the time during which uplink resources are assigned to the user equipment 100$_n$ from the uplink resource managing section 2011, and of the time during which the uplink radio quality is good from the uplink radio quality monitoring section 20816.

In addition, when the charging section 2012 performs stepwise flat-rate charging, the section 2012 may perform the stepwise flat-rate charging by considering the measured time. For example, the charging section 2012 may be configured to charge a first step flat rate in the stepwise flat-rate charging when the measured time is a predetermined threshold or less, while charging a second step flat rate in the stepwise flat-rate charging when the measured time is more than the predetermined threshold.

The time measuring processing in the DRX control section 2084, uplink timing control section 2085, uplink resource managing section 2011 and uplink radio quality monitoring section 20816 will be described below with reference to FIGS. 6 to 9.

Figure 6:
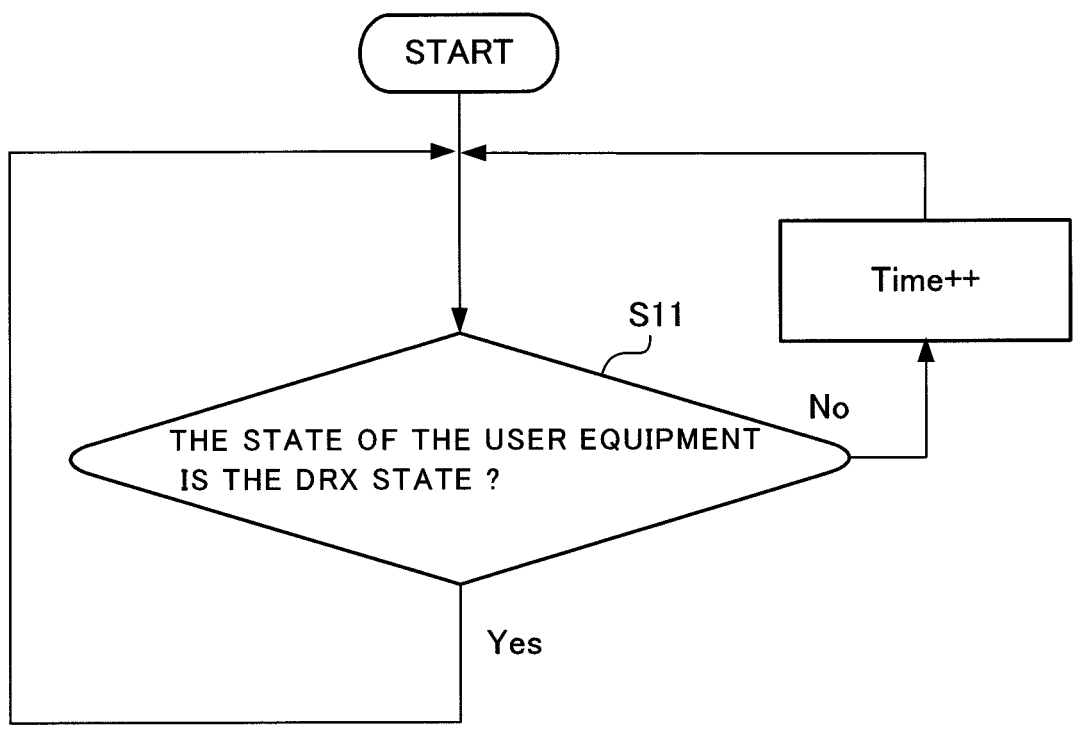
FIG. 6 is a diagram illustrating the Embodiment of the base station apparatus according to the invention and is a flowchart illustrating time measuring processing in a DRX control section.

FIG. 6 is a flowchart illustrating the time measuring processing in the DRX control section.

The DRX control section 2084 manages the DRX state of the user equipment 100$_n$ by transmission of the Physical Downlink Control Channel as described above.

In this state, the DRX control section 2084 determines whether or not the user equipment 100$_n$ is in the DRX state (step S11), and when it is determined that the user equipment 100$_n$ is not in the DRX state i.e. in the Non-DRX state (step S11: No), measures a time in the Non-DRX state on the user equipment 100$_n$.

Meanwhile, when the DRX control section 2084 determines that the user equipment 100$_n$ is in the DRX state (step S11: Yes), the time in the Non-DRX state is not measured.

By the processing, the time in the Non-DRX state is measured on the user equipment 100$_n$.

Figure 7:
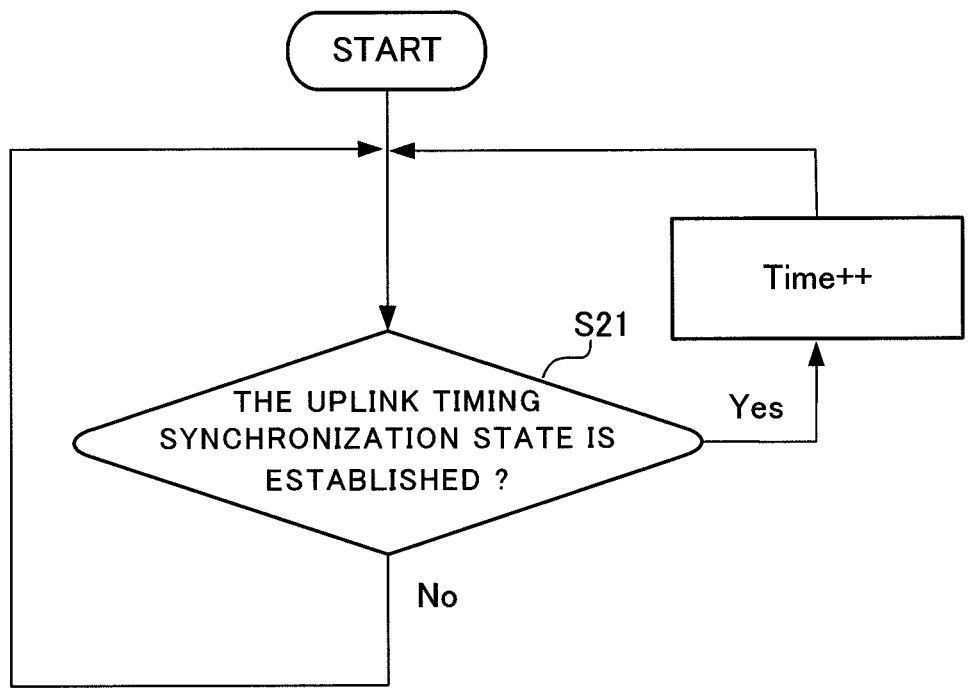
FIG. 7 is a diagram illustrating the Embodiment of the base station apparatus according to the invention and is a flowchart illustrating time measuring processing in an uplink timing control section.

FIG. 7 is a flowchart illustrating the time measuring processing in the uplink timing control section.

As described above, the uplink timing control section 2085 manages the timing synchronization state with the user equipment 100$_n$ by transmission of the Timing Advance and uplink scheduling grant.

In this state, the uplink timing control section 2085 determines whether or not uplink timing synchronization is established between the base station apparatus 200 and the user equipment 100$_n$ (step S21), and when it is determined that uplink timing synchronization is established between the base station apparatus 200 and the user equipment 100$_n$ (step S21: Yes), measures a time during which uplink synchronization is established.

Meanwhile, when the uplink timing control section 2085 determines that uplink timing synchronization is not established between the base station apparatus 200 and the user equipment 100$_n$ (step S21: No), the time during which uplink timing synchronization is established is not measured.

Figure 8:
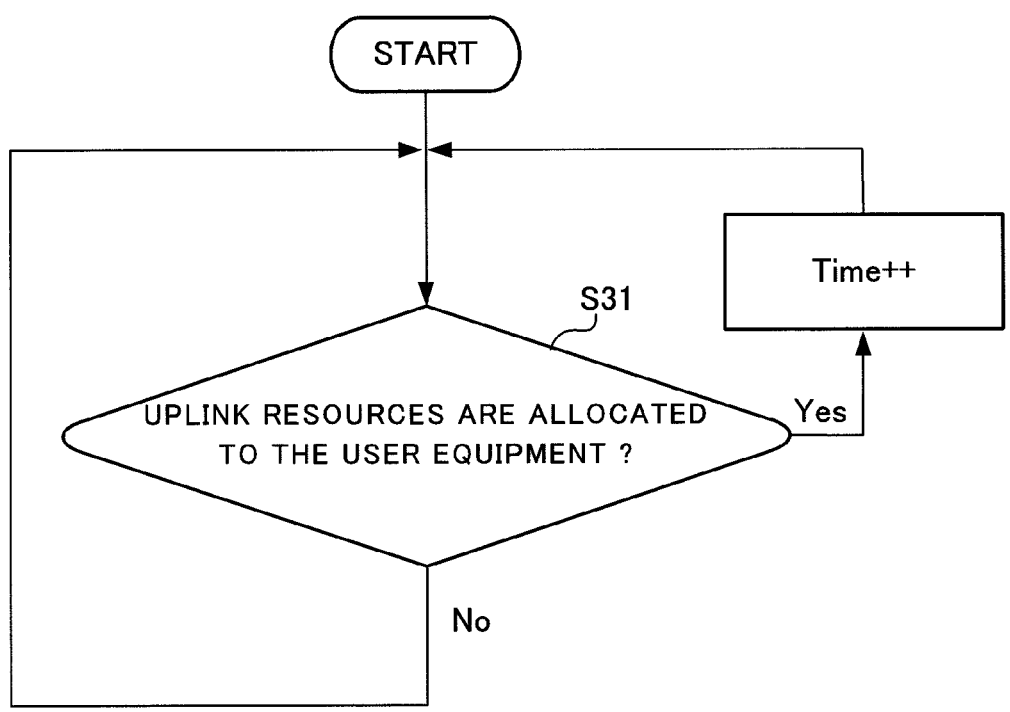
FIG. 8 is a diagram illustrating the Embodiment of the base station apparatus according to the invention and is a flowchart illustrating time measuring process ing in an uplink resource managing section.

FIG. 8 is a flowchart illustrating the time measuring processing in the uplink resource managing section.

As described above, the uplink resource managing section 2011 manages uplink resources to assign to the user equipment 100$_n$, based on the information indicating whether or not timing synchronization is established between the base station apparatus 200 and the user equipment 100$_n$ notified from the uplink timing control section 2085.

In this state, the uplink resource managing section 2011 determines whether or not uplink resources are assigned to the user equipment 100$_n$ (step S31), and when it is determined that uplink resources are assigned to the user equipment 100$_n$ (step S31: Yes), measures a time during which uplink resources are assigned to the user equipment 100$_n$.

Meanwhile, when the uplink resource managing section 2011 determines that uplink resources are not assigned to the user equipment 100$_n$ (step S31: No), the time during which uplink resources are assigned to the user equipment 100$_n$ is not measured.

Figure 9:
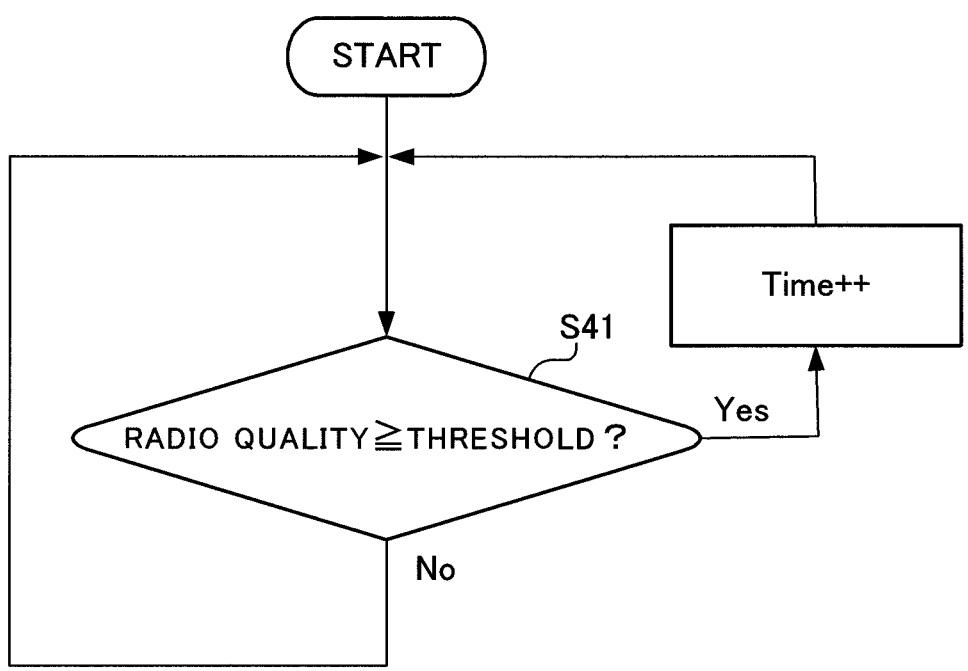
FIG. 9 is a diagram illustrating the Embodiment of the base station apparatus according to the invention and is a flowchart illustrating time measuring processing in an uplink radio quality monitoring section.

FIG. 9 is a flowchart illustrating the time measuring processing in the uplink radio quality monitoring section. As described above, the uplink radio quality monitoring section 20816 stores thresholds as criteria for the uplink radio quality, and manages the radio quality corresponding to whether or not the radio quality is the threshold or more.

In this state, the uplink radio quality monitoring section 20816 determines whether or not the uplink radio quality is the threshold or more (step S41), and when it is determined that the radio quality is the threshold or more (step S41: Yes), measures a time during which the uplink radio quality is the threshold or more.

Meanwhile, when it is determined that the uplink radio quality is less than the threshold (step S41: No), the time during which the uplink radio quality is the threshold or more is not measured.

In addition, the determination of the charging amount by the charging section 2012 may be made by considering all the measured a time or at least one measured a time notified from the DRX control section 2084, uplink timing control section 2085, uplink resource managing section 2011, and uplink radio quality monitoring section 20816. For example, only the DRX control section 2084 notifies the charging section 2012 of the measured a time, and it is possible to eliminate the need for notification from the uplink timing control section 2085, uplink resource managing section 2011, and uplink radio quality monitoring section 20816.

As described above, according to the base station apparatus 200 according to this Embodiment, the time in states in which the mobile communication service is not restricted on the system with respect to the user equipment is measured, such as the time during which the user equipment $100_n$ is in the Non-DRX state, the time during which uplink timing synchronization is established between the user equipment $100_n$ and the base station apparatus 200, the time during which uplink resources are assigned to the user equipment $100_n$, and the time during which the uplink radio quality is kept at a predetermined value or more, and therefore, by determining the charging amount based on the measured time, it is possible to perform suitable charging in consideration of the time during which the mobile communication service is restricted in the connection state between the base station apparatus 200 and the user equipment $100_n$. In addition, herein, the mobile communication service being not restricted on the system with respect to the user equipment may mean that the user equipment is in a state capable of communicating.

Figure 10:
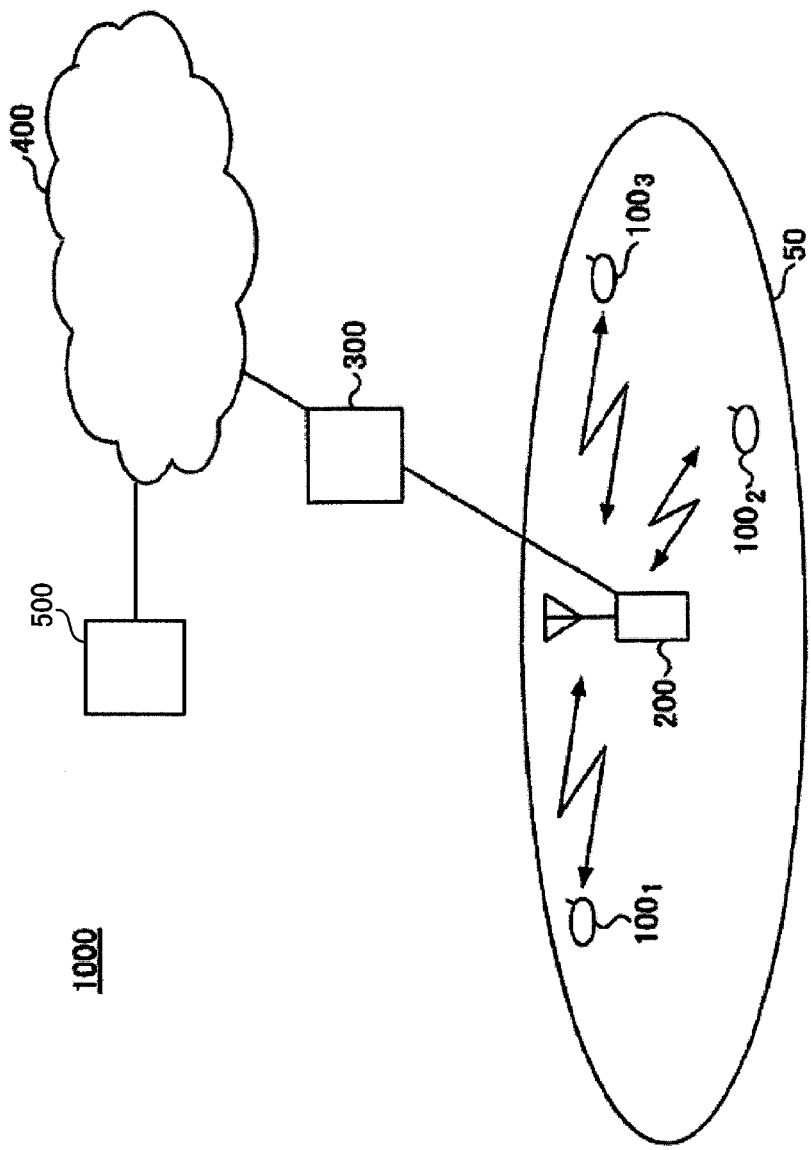
FIG. 10 is a diagram illustrating a modification of the base station apparatus according to the invention.

In addition, in this Embodiment, the base station apparatus 200 has the configuration provided with the charging section 2012. Further, as in a radio communication system 2000 as shown in FIG. 10, a charging apparatus 500 may be connected to a core network 400, and provided with the charging section 2012. In this case, the charging apparatus 500 is notified of the measured time from the DRX control section 2084, uplink timing control section 2085, uplink resource managing section 2011, and uplink radio quality monitoring section 20816.

Further, the Embodiment disclosed this time is illustrative in all the respects, and the invention is not limited to the Embodiment. The scope of the invention is indicated by the scope of the claims rather than by the description of only the above-mentioned Embodiment, and is intended to include senses equal to the scope of the claims and all modifications within the scope of the claims.

INDUSTRIAL APPLICABILITY

As described above, the invention has the effect of performing appropriate time charging based on actual communication conditions, and particularly, is useful in the base station apparatus, mobile communication system and communication control method for determining a charging amount in the connection state with the user equipment.

We claim:
1. A base station apparatus comprising:
   a connection section configured to establish connection with user equipment; and
   a timing section configured to measure a time under charging such that the user equipment is in a state capable of communicating within a connection period during which the user equipment is in a connection state;
   wherein the timing section has a discontinuous reception state managing section configured to determine whether the user equipment is in a discontinuous reception state in which the user equipment receives a physical downlink control channel intermittently or in a non-discontinuous reception state based on a transmission timing of a physical downlink control channel for new transmission to the user equipment and DRX Inactive Timer started from the transmission timing to measure a time during which the user equipment is in the non-discontinuous reception state.

2. The base station apparatus according to claim 1, further comprising:
   a charging section configured to determine a charging amount based on the time measured by the timing section.

3. The base station apparatus according to claim 1, wherein the timing section has an uplink timing synchronization state managing section configured to manage a timing synchronization state in uplink of the user equipment, and
   the uplink timing synchronization state managing section measures a time during which the timing synchronization state in uplink of the user equipment is established.

4. The base station apparatus according to claim 3, wherein the uplink timing synchronization state managing section determines that the timing synchronization state in uplink is not established when a predetermined period of time has elapsed since timing of transmitting a Timing Advance signal to the user equipment.

5. The base station apparatus according to claim 3, wherein the uplink timing synchronization state managing section determines that the timing synchronization state in uplink is established from timing of correctly receiving an uplink shared channel from the user equipment, the uplink shared channel which is instructed the user equipment to transmit using a random access response signal in a random access procedure.

6. The base station apparatus according to claim 1, wherein the timing section has an uplink resource managing section configured to manage an uplink resource of the user equipment, and
   the uplink resource managing section measures a time during which uplink resources are assigned to the user equipment.

7. The base station apparatus according to claim 6, wherein the uplink resource managing section determines that the uplink resources assigned to the user equipment are released when a predetermined period of time has elapsed since timing of transmitting a Timing Advance signal to the user equipment.

8. The base station apparatus according to claim 6, wherein the uplink resource managing section manages resources for an uplink control channel or resources for a sounding reference signal.

9. The base station apparatus according to claim 1, wherein the timing section has an uplink radio quality monitoring section configured to monitor uplink radio quality of the user equipment, and the uplink radio quality monitoring section measures a time during which the uplink radio quality is on a predetermined threshold or more.

10. The base station apparatus according to claim 9, wherein the uplink radio quality monitoring section monitors at least one of quality of an uplink control channel, quality of an uplink demodulation reference signal, and quality of an uplink sounding reference signal.

11. A mobile communication system comprising:

a base station apparatus connected with user equipment; and a charging apparatus configured to perform charging management of the user equipment, wherein the base station apparatus determines whether the user equipment is in a discontinuous reception state in which the user equipment receives a physical downlink control channel intermittently or in a non-discontinuous reception state based on a transmission timing of a physical downlink control channel for new transmission to the user equipment and DRX Inactive Timer started from the transmission timing and measures a time during which the user equipment is in the non-discontinuous reception state in a connection state with the user equipment, and the charging apparatus determines a charging amount based on the time measured by the base station apparatus.

12. A communication control method comprising the steps of:

establishing connection with user equipment;

determining whether the user equipment is in a discontinuous reception state in which the user equipment receives a physical downlink control channel intermittently or in a non-discontinuous reception state based on a transmission timing of a physical downlink control channel for new transmission to the user equipment and DRX Inactive Timer started from the transmission timing and measures a time during which the user equipment is in the non-discontinuous reception state within a connection period during which the user equipment is in a connection state; and determining a charging amount based on the measured time.

* * * * *